US009673946B2

(12) United States Patent
Kenney et al.

(10) Patent No.: US 9,673,946 B2
(45) Date of Patent: Jun. 6, 2017

(54) TRANSMIT BEAMFORMING SOUNDING WITH TRAVELING PILOTS

(71) Applicant: Intel Corporation, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,856

(22) PCT Filed: Oct. 11, 2013

(86) PCT No.: PCT/US2013/064661
§ 371 (c)(1),
(2) Date: Dec. 12, 2013

(87) PCT Pub. No.: WO2015/053790
PCT Pub. Date: Apr. 16, 2015

(65) Prior Publication Data
US 2016/0211957 A1 Jul. 21, 2016

(51) Int. Cl.
H04W 4/00 (2009.01)
H04L 5/00 (2006.01)
(Continued)

(52) U.S. Cl.
CPC ......... H04L 5/0048 (2013.01); H04B 7/0617 (2013.01); H04B 7/0626 (2013.01);
(Continued)

(58) Field of Classification Search
CPC H04L 5/0048; H04W 72/0453; H04W 16/28; H04B 7/0617
See application file for complete search history.

(56) References Cited

U.S. PATENT DOCUMENTS

2006/0285479 A1* 12/2006 Han .................... H04B 7/0678
370/203
2009/0060075 A1 3/2009 Mohebbi
(Continued)

FOREIGN PATENT DOCUMENTS

| CN | 105612779 A | 5/2016 |
| WO | WO-2013130460 A1 | 9/2013 |
| WO | WO-2015053790 A1 | 4/2015 |

OTHER PUBLICATIONS

"International Application Serial No. PCT/US2013/064661, International Preliminary Report on Patentability mailed Apr. 21, 2016", 8 pgs.
(Continued)

Primary Examiner — Afshawn Towfighi
(74) Attorney, Agent, or Firm — Schwegman Lundberg & Woessner, P.A.

(57) ABSTRACT

This document discusses, among other things, apparatus and methods for transmit beamforming sounding. An example method for communicating over a wireless network having multiple sub-carrier frequencies can include assigning a first pilot signal to a first sub-carrier frequency for transmission with a first symbol, transmitting the first symbol from a first wireless device, receiving the first symbol at a second wireless device, determining channel time and phase offset using the first pilot signal, and estimating transmit beamforming channel state information using the first pilot signal.

17 Claims, 6 Drawing Sheets

(51) Int. Cl.
  *H04W 24/00* (2009.01)
  *H04B 7/06* (2006.01)
  *H04W 16/28* (2009.01)
  *H04W 72/04* (2009.01)
  *H04L 27/26* (2006.01)

(52) U.S. Cl.
  CPC ........... *H04L 5/0023* (2013.01); *H04W 16/28* (2013.01); *H04W 24/00* (2013.01); *H04W 72/0453* (2013.01); *H04L 27/2613* (2013.01)

(56) References Cited

U.S. PATENT DOCUMENTS

| | | | |
|---|---|---|---|
| 2009/0213948 A1* | 8/2009 | Ma | H04L 25/0226 375/260 |
| 2010/0008289 A1* | 1/2010 | Scarpa | H04L 27/3466 370/317 |
| 2012/0020427 A1 | 1/2012 | Butussi et al. | |
| 2013/0010808 A1 | 1/2013 | Ma et al. | |
| 2013/0223359 A1 | 8/2013 | Kenney et al. | |
| 2014/0269981 A1* | 9/2014 | Asjadi | H04L 27/2601 375/295 |
| 2015/0288498 A1* | 10/2015 | Kliger | H04L 5/0048 370/491 |
| 2016/0087708 A1* | 3/2016 | Kang | H04B 7/0619 370/312 |

OTHER PUBLICATIONS

"International Application Serial No. PCT/US2013/064661, International Search Report mailed Jul. 17, 2014", 3 pgs.

"International Application Serial No. PCT/US2013/064661, Written Opinion mailed Jul. 17, 2014", 6 pgs.

"Korean Application Serial No. 2016-7006393, Office Action mailed Apr. 11, 2017". w/English Translation. 12 pgs.

\* cited by examiner

TRANSMIT BEAMFORMING SOUNDING WITH TRAVELING PILOTS

This application is a U.S. National Stage Filing under 35 U.S.C. 371 from International Application No. PCT/US2013/064661, filed Oct. 11, 2013, which is incorporated herein by reference in its entirety.

TECHNICAL FIELD

This document discusses, among other things, wireless communications and, more particularly, beamforming sounding techniques using traveling pilots.

BACKGROUND

Sensor networks have numerous applications, such as security, industrial monitoring, military reconnaissance, and biomedical monitoring. In many such applications, it is either inconvenient or impossible to connect the sensors by wire or cable; a wireless network is preferable. Sensor networks may be implemented indoors or outdoors. Seismic sensors, for example, may be used to detect intrusion or movement of vehicles, personnel, or large earth masses.

The detection of vehicles and personnel is more difficult than detecting large signals, as from earthquakes or movement of earth masses. The reliable detection or tracking over large areas thus requires very large numbers of sensitive detectors, spaced closely. Although placing sensor nodes in the environment is relatively easy, and configuring them in a network is manageable, a problem faced by sensor networks is that determining where they are in geographic coordinate locations is difficult and expensive. A wireless network of numerous sensitive, low cost, low-powered sensor stations is more desirable. However, the resulting overhead for channel estimation is usually prohibitive in a wireless sensor network.

DESCRIPTION OF THE EMBODIMENTS

Wireless electronic evolution has made possible phenomenal computing and communication capabilities to be packed into relatively tiny devices such as cellular phones, personal digital assistants and smart phones. Through the evolution, faster networks with wider bandwidths have allowed these devices to provide an abundance of visual and textual information at the users fingertips. Recently, innovators have been thinking about how slower and smaller bandwidth wireless networks can be used in an efficient manner. A wireless communications standard is being developed by the Institute of Electrical and Electronics Engineers (IEEE) 802.11ah (11ah) task group. IEEE 802.11ah (11ah) is a new technology evolution for WiFi and is in the standards development phase; very low data rate operation is being enabled. In IEEE 802.11a/g, 20 MHz channel widths were defined and in IEEE 802.11n 40 MHz was added and then in IEEE 802.11ac both 80 and 160 MHz. In the past the evolution of WiFi has been to increase data rate, but IEEE 802.11ah (11ah) actually targets comparatively lower rate services. Protocols have developed for applications that generally communicate a limited amount of data. Such applications can include for example, sensor applications, were the amount of data from a particular device is limited to information about the sensor and the measurement the sensor is designed for.

Figure 1:
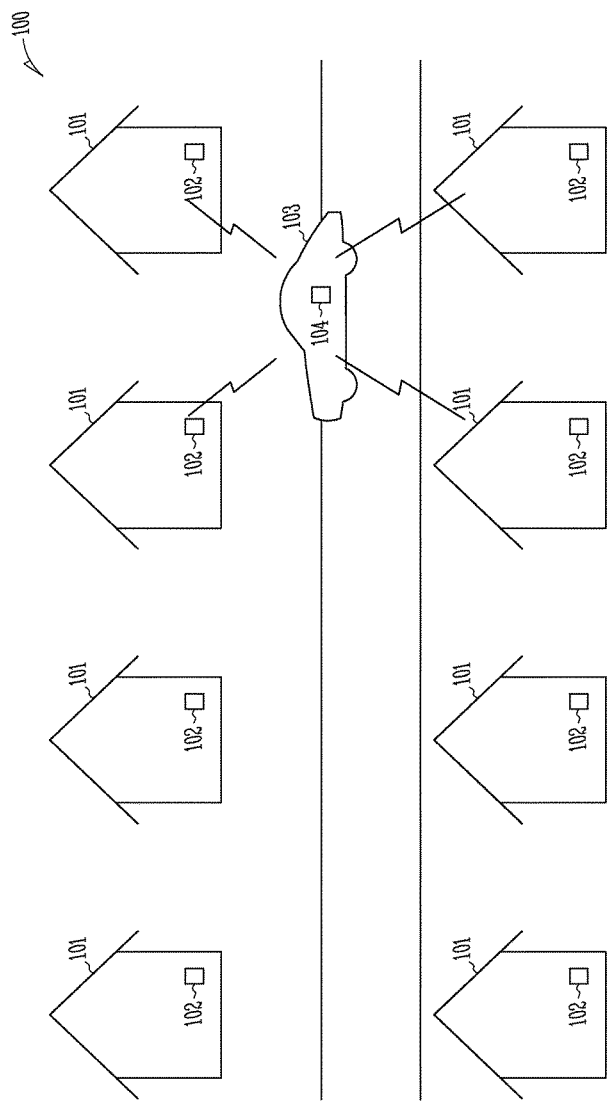
FIG. 1 illustrates generally an example sensor application 100.

FIG. 1 illustrates generally an example sensor application 100. In certain examples, each home 101 in a neighborhood can include one or more sensors 102 for measuring utilities consumed at each home 101. The utilities can include but are not limited to, electricity, natural gas, water, sewer, or combinations thereof. Traditionally, utility billing would require personnel visit each individual sensor 102 to determine and record the amount of a utility used by the home 101. In the illustrated example, each sensor 102 can include a wireless radio and can at least transmit sensor information. In certain examples, a vehicle 103 with a compatible wireless receiver 104 can be used to collect data and can collect the data as the vehicle 103 moves down a street adjacent to the sensors 102. Such a system can save resources over traditional methods of collecting sensor information in which each sensor 102 needed to be viewed to collect the pertinent information. In certain examples, the sensor data can include information beyond the information needed for billing a customer. For example, the sensor information can include information about the sensor operation, such information can include battery level information to, for example, indicate that a sensor battery or some other component may have a problem or may need servicing.

In certain examples, a wireless sensor network such as the one shown in FIG. 1 can provide adequate sensor information using relatively small amounts of communication data. Thus, the wireless network can use lower frequencies and lower data rates and still provide excellent performance. However, because the system can include components that are not stationary, Doppler effects associated with one or more of the wireless devices moving can deteriorate communication performance. The present inventors have recognized a method of training channels of a wireless network to account for environmental conditions such a moving network component without affecting performance compared to other channel training methods.

In certain examples, the wireless network can include a traveling pilot mechanism that can allow the system to compute transmit beamforming channel state information (CSI). In some examples, the CSI can be computed during normal data transmission compared to other protocols that can require a separate transmission for computing the CSI. In contrast to the present subject matter, IEEE 802.11ac currently requires a separate transmission for computing CSI. More particularly, an IEEE 802.11ac compatible beamformer sends a null data packet (NDP) to a compatible beamformee to allow the computation of the CSI. The NDP can include a preamble with enough long training fields (LTFs) to sound all transmit antennas. The beamformee can use the preamble portion of the NDP to compute the CSI and feed the CSI back to the beamformer at a later time. Sounding is a method for collecting information about transmission characteristics of a channel that can be used to adjust transmission or reception parameters to improve or condition one or more performance aspects of the channel. The method can include transmitting a known signal from one or more antennas, receiving the transmitted signal at one or more antennas, and comparing the received signal to a copy of the transmitted signal to ascertain characteristics about the transmission channel.

In certain examples, a method of beamforming sounding according to the present subject matter can sound all the sub-carriers without a loss in receiver performance and without using a separate transmission, such as an NDP. In addition, because a separate transmission is not needed to compute the CSI, a wireless network device according the present subject matter can conserve battery power allowing for longer periods of operation between battery charging/replacement events. In certain examples, a pilot signal can be assigned to travel through sub-carrier locations. In some examples, the pilot signal sub-carrier assignment can be shifted sequentially. In some examples, the pilot signal sub-carrier assignment can be shifted in a non-sequential pattern. In some example, the pilot signal sub-carrier assignment can be shifted randomly.

In certain examples, a receiving unit can use the traveling pilots to track channel states during the evolution of a packet. In some examples, the traveling pilot can shift to different carrier positions over the useful portion of the band during the packet. In certain examples, the useful portion of the band can include all sub-carriers that would be used for data and pilot sub-carriers. In some examples, the useful portion does not include guard sub-carriers. In some examples, the useful portion does not include other nulled sub-carriers. In some examples, the useful portion does not include guard sub-carriers and other nulled sub-carriers.

In certain examples, upon reception, the traveling pilots can be used to compute new channel state information for the corresponding sub-carriers. In some examples, as the traveling pilot shifts through all the data sub-carriers, the channel state can be tracked dynamically. In certain examples, a receiving station can use the received traveling pilots to compute beamforming feedback estimates for transmission back to the transmitting device. The transmitting device can use the beamforming feedback estimates to modify transmission parameters to maintain or improve data throughput as well as performance. In certain examples, using traveling pilots according to the present subject matter, a transmission device can conserve power by avoiding additional packet exchanges dedicated to generating beamforming feedback.

Figure 2A:
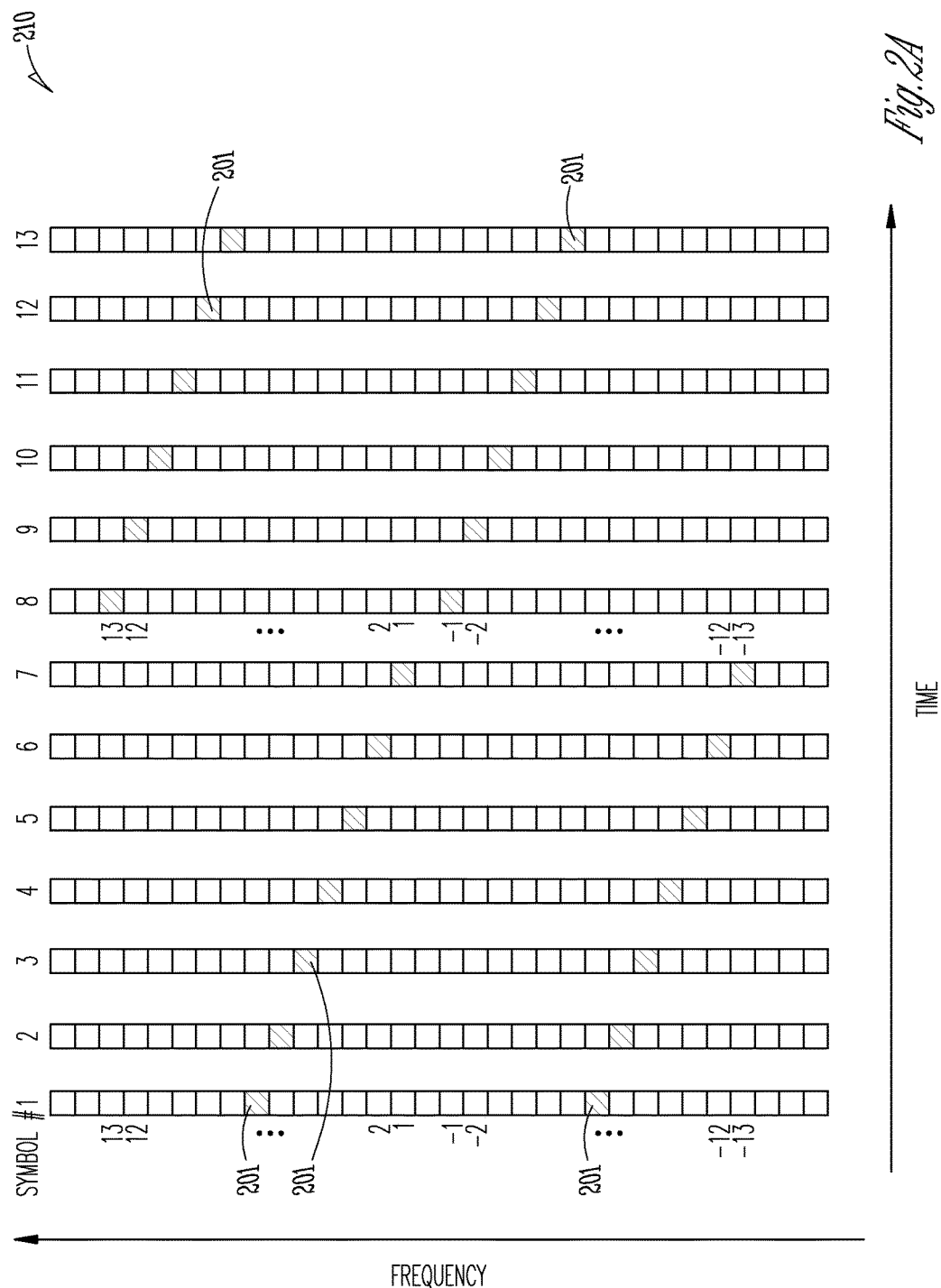
FIGS. 2A-2C illustrates generally example traveling pilot signal sub-carrier assignments.
Figure 2B:
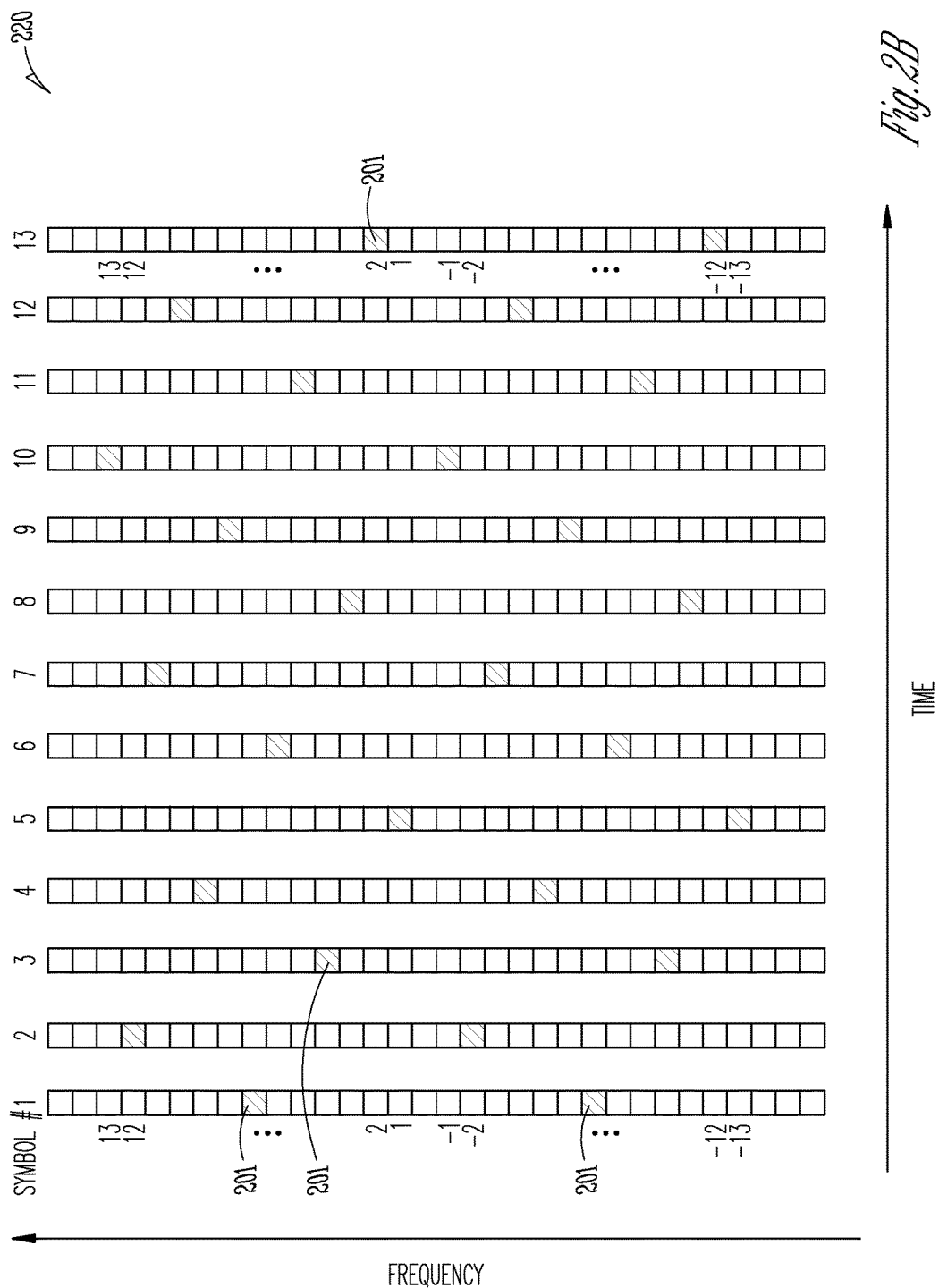

FIGS. 2A and 2B illustrates generally example traveling pilot signal sub-carrier assignments. FIG. 2A illustrates generally a sequential pattern 210 of assigning one or more traveling pilot signals 201 to sub-carriers. FIG. 2B illustrates generally a non-sequential pattern 220 of assigning one or more traveling pilot signals 201 to sub-carriers. It is understood that other patterns as well as randomly assigning a pilot signal to a sub-carrier are also possible without departing from the scope of the present subject matter.

Figure 2C:
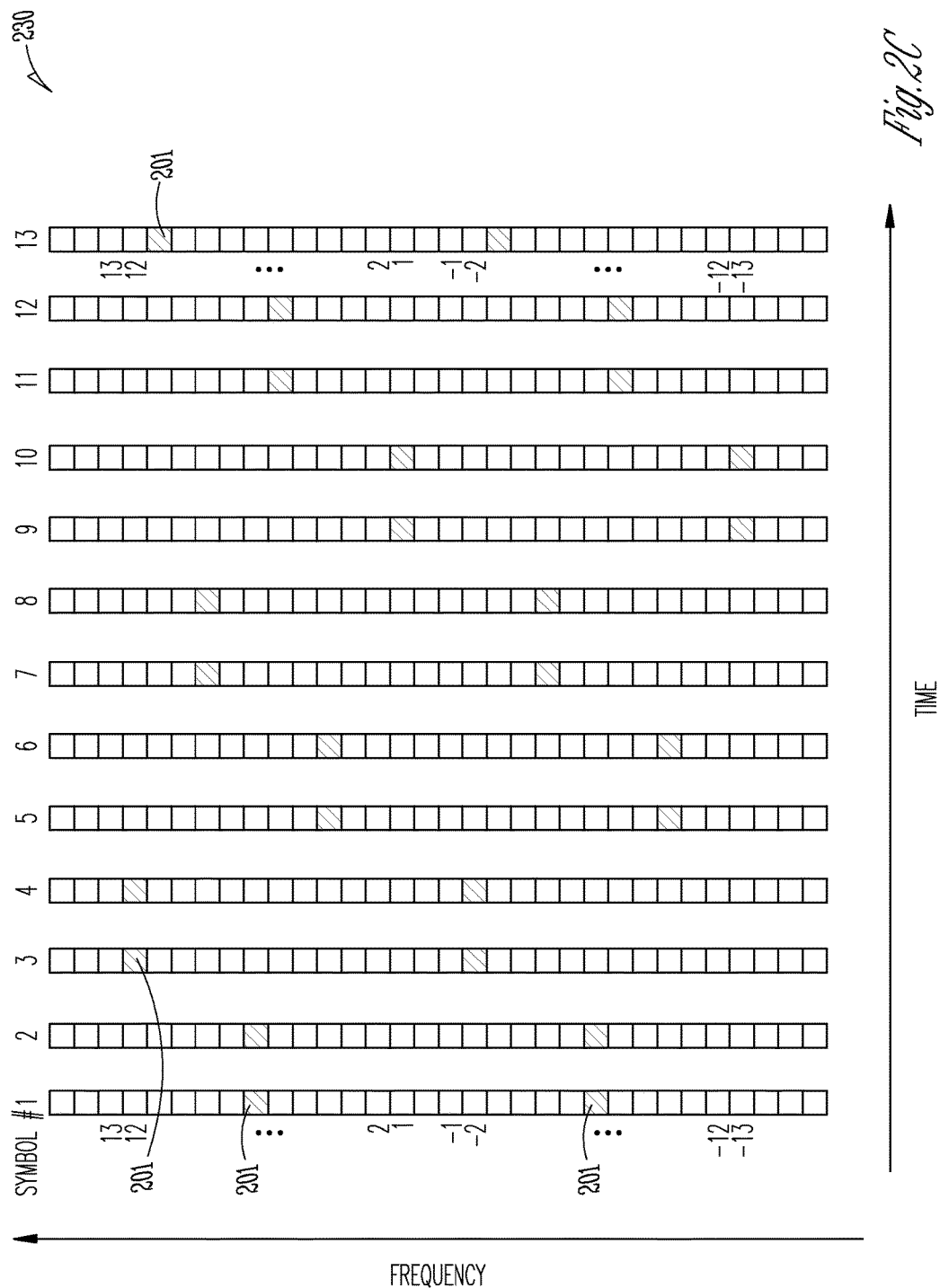

In certain examples, a traveling pilot mechanism can be used with a dwell time, N. set equal to the number of transmission antennas, for example. In some examples, N can represent the number of symbols a pilot signal 201 occupies within a sub-carrier before shifting to the next sub-carrier location. The example assignment patterns of FIGS. 2A and 2B illustrate a dwell time of N=1. FIG. 2C illustrates generally a non-sequential pattern 230 of assigning one or more pilot signals 201 to sub-carrier locations using a dwell time of N=2. As can be seen, the pattern is the same as that of FIG. 2B except that the pilot signal 201 occupies each sub-carrier position for two consecutive symbols. It is understood that other dwell times can be used without departing from the scope of the present subject matter. In certain examples, the dwell time is known by a controller of both the transmitting device and the receiver device.

In certain examples, an overlay can be applied to the pilot signals, for example, to assist in resolving channel dimensions. In certain examples, the P-matrix, a mapping matrix used for mapping long training field data tones to multiple spatial streams, can be applied to the pilot signals. Eq. (1) illustrates the P-matrix defined for up to four streams.

$$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad (\text{Eq. 1})$$

For examples using less than 4 streams, a subset of the P-matrix can be used. For example, for a system using two antennas, the P-matrix can be:

$$P = \begin{bmatrix} 1 & -1 \\ 1 & 1 \end{bmatrix} \quad (\text{Eq. 2})$$

In a system using transmitter with two antennas, or a dwell time of N=2, for a first dwell period, elements of the first column or row can be applied to the two antennas respectively. During the second dwell period, elements of the second column or row can be used. Using this approach, a controller of the receiver can resolve the CSI for all channel dimensions. It is understood that other overlay sequences other than the P matrix sequences are possible without departing from the scope of the present subject matter.

In certain examples, the CSI can be computed for a group of sub-carriers in a very deterministic manner. For example, in an IEEE 802.11ah system, which can use 2 pilot sub-carriers and 24 data sub-carriers (e.g., 26 total data bearing sub-carriers), it can take 26/2=13 OFDM symbols to cover all the sub-carriers with an antenna count/dwell time of N=1. If the number of antennas/dwell time is N=2, it can take twice as long or 26 OFDM symbols to cover all the sub-carriers.

Compared to other methods of computing CSI, in certain examples, the techniques discussed above can allow averaging the CSI over the length of a packet, depending on the channel and the packet length. In some examples, the CSI can be time-weight averaged over the packet where the time-weight is a function of estimated Doppler effect observed in the channel. In certain example, averaging can improve the CSI estimate compared to the null data packet (NDP) approach that uses a fixed LTF length.

In certain examples, techniques according to the present subject can be implemented with minimal effect to the receiver tracking algorithms and a receiver controller can use the pilot signals to compute needed receiver parameters on a symbol basis such as time and phase offset. In certain examples, the receiver controller may need to remove the overlay, however, the overlay can be predetermined, thus, the modification is straightforward.

In certain examples, traveling pilots, as discussed above, can be used to obtain transmit beamforming channel state information using typical transmissions by introducing a dwell equal to the number of transmit antennas and applying and overlay a matrix on the pilot signals. Such examples can avoid transmitting a separate null data packet (NDP) transmission and, thus, increase throughput over systems that do require a NDP transmission. In certain examples, avoiding a separate NDP transmission can improve battery life of the transmitter. In certain examples, avoiding a separate NDP transmission can improve battery life of the receiver by allowing the receiver additional sleep time that would have otherwise been used to receive the additional transmission. In certain examples, depending on packet length, traveling pilots according to the present subject matter, can allow more integration time to improve the CSI estimate. In non-Doppler channels, examples according to the present subject matter can realize improve system performance from better throughput and improved battery life. In Doppler affected channels, examples according to the present subject matter can realize additional performance improvements when more than one antenna is used. In addition, the present subject matter can be implemented in existing systems with easily implemented and straightforward modifications.

Figure 3:
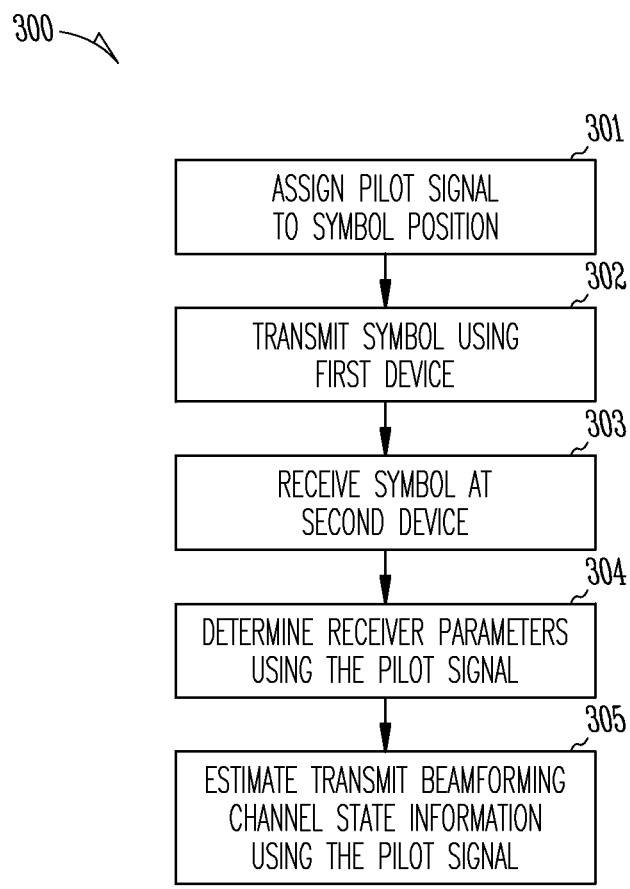
FIG. 3 illustrates generally a flowchart of an example method of beamforming sounding using traveling pilot signals.

FIG. 3 illustrates generally a flowchart of an example method 300 of beamforming sounding using traveling pilot signals. At 301, a first pilot signal can be assigned to a sub carrier position of frequency within symbol. At 302, the symbol can be transmitted by a first device. At 303, the symbol can be received at a second device. At 304, the second device can determine time and phase offsets of the channel using the first pilot signal; At 305, the second device can estimate transmit beamforming channel state information using the received pilot signal. In certain examples, the second device can feedback beamforming channel state information to the first device. In certain examples, the first device can assign a traveling pilot to an immediately adjacent position in an immediately subsequent symbol. In some examples, the first device can assign subsequent pilot signal positions according to a predetermined pattern. In some examples, the first device can assign subsequent pilot signal positions randomly. In some example, the first device can assign a traveling pilot to the same position in an immediately subsequent symbol. Such an assignment can assist in providing information about multiple antennas of the first device. In certain examples, the first device can apply an overlay to a pilot symbol before transmitting the symbol. After receiving one or more pilot symbols, the receiving device can determine or compute status information to allow adjustment and subsequent improvement of reception performance. In certain examples, after receiving one or more pilot symbols, the receiving device, using one or more processors or controllers, can estimate transmit beamforming channel status information and can feedback the beamforming channel status information to the first device. In some examples, the first device, using one or more processors or controllers, can adjust transmission parameters to improve communication performance between the first and second devices using the channel state information received from the second device.

Figure 4:
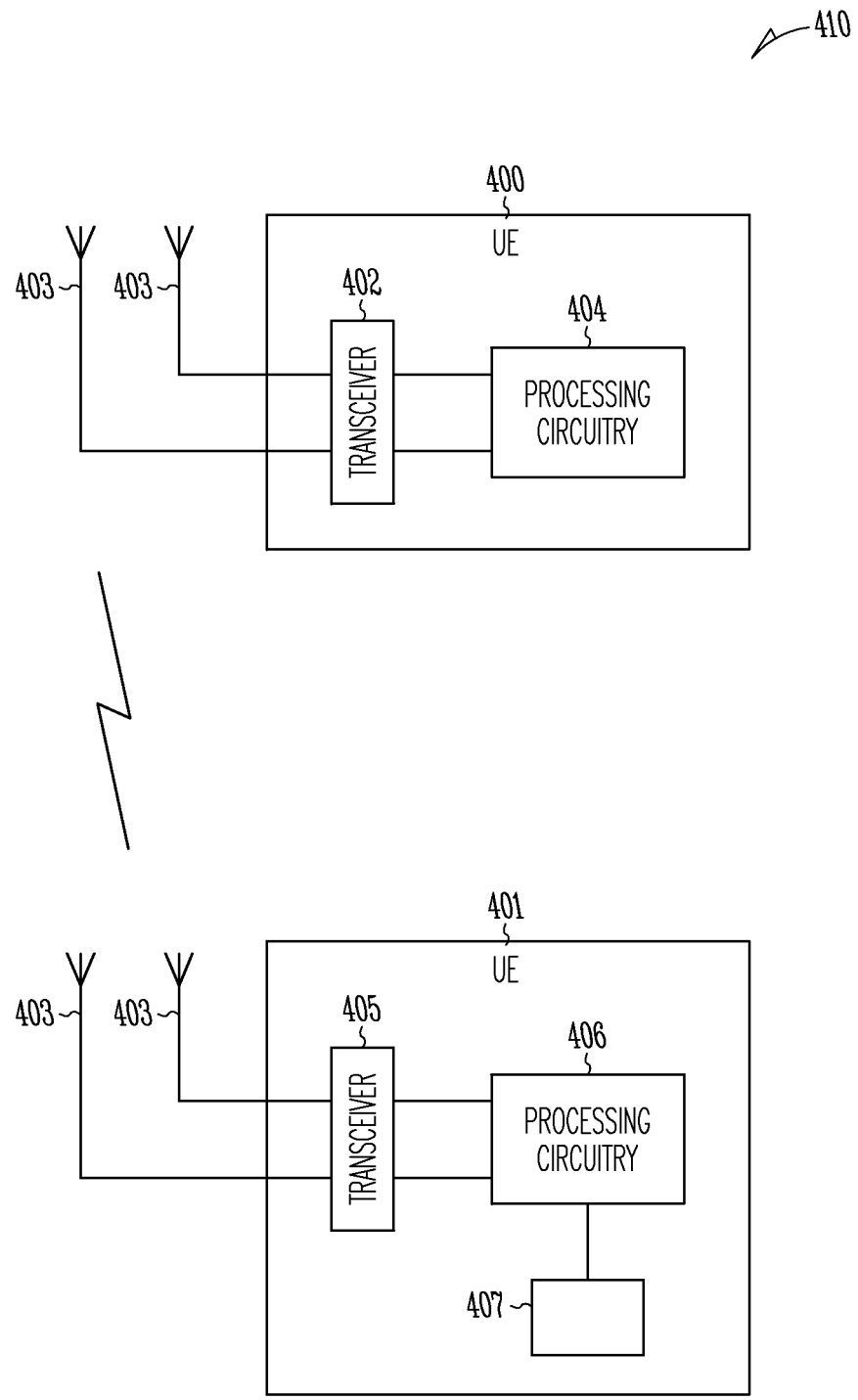
FIG. 4 illustrates generally an example wireless device adapted to use traveling pilots.

FIG. 4 illustrates generally a system 410 including example wireless devices 400, 401 for assigning traveling pilots, estimating transmit beamforming channel state information using the pilots, and using beamforming feedback estimates to configure desired transmit channel conditions. In certain examples, processing circuitry 404 and a transceiver 402 may be part of a first portable wireless communication device 400, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some examples, antennas 403 can comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In certain examples, each aperture can be considered a separate antenna. In some multiple-input multiple-output (MIMO) examples, antennas 403 may be effectively separated to take advantage of spatial diversity and the different channel characteristics that may result between each of antennas 403 and the antennas of a transmitting station. In some MIMO embodiments, antennas 403 may be separated by up to $1/10$ of a wavelength or more.

In certain examples, a second wireless device 401 can be either portable or fixed and can include a transceiver 405, processing circuitry 406, and a sensor 407, such as a meter sensor for providing information about a metered commodity such as water, electricity, or other substance of interest such that information about the substance can be wirelessly transmitted from the second wireless device 401 to the first wireless device 400 even when one or more of the wireless devices are moving.

In certain examples, the first or second devices 400, 401 can include one or more of a keyboard, a display, a non-volatile memory port, multiple antennas, a graphics processor, an application processor, speakers, and other mobile device elements. The display may be an LCD screen including a touch screen. Although the system 410 is illustrated as having several separate functional elements, one or more of the functional elements may be combined and may be implemented by combinations of software-configured elements, such as processing circuitry 404, 406 including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the system 400 may refer to one or more processes operating on one or more processing elements. In certain examples, the system 410 can include an access point device (not shown) to relay information between the first wireless device 400 and the second wireless device 401. In some examples, the first wireless device 400 can include access point functionality.

ADDITIONAL NOTES

In Example 1, a method for communicating over a wireless network having multiple sub-carrier frequencies can include assigning a first pilot signal to a first sub-carrier frequency for transmission with a first symbol, transmitting the first symbol from a first wireless device, receiving the first symbol at a second wireless device, determining channel time and phase offset using the first pilot signal, and estimating transmit beamforming channel state information using the first pilot signal.

In Example 2, the method of Example 1 optionally includes transmitting the transmit beamforming channel state information to the first wireless device.

In Example 3, the method of any one or more of Examples 1-2 optionally includes assigning a second pilot signal to a second sub-carrier frequency for subsequent transmission with a second symbol, the second sub-carrier frequency different than the first sub-carrier frequency.

In Example 4, the second sub-carrier frequency of any one or more of Examples 1-3 optionally includes a second sequential sub-carrier frequency.

In Example 5, the second symbol of any one or more of Examples 1-4 optionally is configured for transmission immediately subsequent to the first symbol.

In Example 6, the assigning a first pilot signal of any one or more of Examples 1-5 optionally includes assigning a plurality of pilot signals to a plurality of first sub-carrier frequencies for transmission with the first symbol.

In Example 7, the method of any one or more of Examples 1-6 optionally includes assigning the first pilot signal to the first sub-carrier frequency for transmission with one or more immediately-subsequent symbols.

In Example 8, the method of any one or more of Examples 1-7 optionally includes applying an overlay to each pilot signal, the overlay configured to assist resolve channel dimensions when the first wireless device includes more than one transmit antenna.

In Example 9, the overlay of any one or more of Examples 1-8 optionally is associated with a column or row of an overlay matrix.

In Example 10, the determining channel time and phase offsets using the first pilot signal of any one or more of Examples 1-9 optionally includes removing the overlay from the first pilot symbol.

In Example 11, the estimating the transmit beamforming channel state information of any one or more of Examples 1-10 optionally includes averaging the transmit beamforming channel state information over a packet length.

In Example 12, the estimating the transmit beamforming channel state information of any one or more of Examples 1-11 optionally includes time-weight averaging the transmit beamforming channel state information over a packet length to better estimate a Doppler effect.

In Example 13, a wireless transmitter configured to transmit over wireless network can include a controller configured to position one or more pilot signals within a sub-carrier frequency of each of a plurality of symbols according to a predetermined pattern to assist with determining transmit beamforming channel state information, to receive transmit beamforming channel status information based on the one or more pilot signals from a second wireless transmitter, and to adjust transmit parameters based on the transmit beamforming channel status information.

In Example 14, the predetermined pattern of any one or more of Examples 1-13 optionally includes assigning the pilot signal at a first sub-carrier frequency for a number of sequential symbols before placing the pilot signal at a second sub-carrier frequency.

In Example 15, the number of sequential symbols of any one or more of Examples 1-14 optionally is equal to the number of antennas associated with the wireless transmitter.

In Example 16, the controller of any one or more of Examples 1-15 optionally is configured to apply an overlay to each pilot signal of the one or more pilot signals, wherein the overlay corresponds to a predetermined matrix used with a wireless receiver.

In Example 17, a wireless receiver configured to communicate a wireless network can include a controller configured to receive a plurality of symbols, each symbol including one or more pilot signals positioned at a sub-carrier frequency and to estimate transmit beamforming channel state information using the one or more pilot signals.

In Example 18, the controller of any one or more of Examples 1-17 optionally is configured to average the beamforming channel state information over a packet of symbols, wherein the packet includes at least a portion of the plurality of symbols.

In Example 19, the controller of any one or more of Examples 1-18 optionally is configured to time-weight average the beamforming channel state information over the packet of symbols.

In Example 20, the controller of any one or more of Examples 1-19 optionally is configured to remove an overlay from each pilot signal to provide an un-layered pilot signal and to determine channel time and phase offsets using the un-layered pilot signal, wherein the overlay corresponds to an element of a predetermined matrix used with a transmitter of the plurality of symbols.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method performed by an apparatus of a wireless device, the method for communicating over a wireless network having multiple sub-carrier frequencies, the method comprising:
   receiving a plurality of symbols, each symbol comprising a plurality of sub-carriers and one or more pilot signals positioned at a sub-carrier frequency wherein for the plurality of symbols a pilot signal of the one or more pilot signals is positioned in a different one of each of the plurality of sub-carriers for at least one symbol of the plurality of symbols;
   determining channel time and phase offset using the one or more pilot signals; and
   estimating transmit beamforming channel state information using the one or more pilot signals.

2. The method of claim 1, including transmitting the transmit beamforming channel state information to the first wireless device.

3. The method of claim 1, wherein determining channel time and phase offsets using the one or more pilot signals includes removing an overlay from the one or more pilot signals, the overlay configured to assist to resolve channel dimensions when the first wireless device includes more than one transmit antenna.

4. The method of claim 1, wherein estimating the transmit beamforming channel state information includes averaging the transmit beamforming channel state information over a packet length.

5. The method of claim 1, wherein estimating the transmit beamforming channel state information includes time-weight averaging the transmit beamforming channel state information over a packet length to better estimate a Doppler effect.

6. A method performed by an apparatus of a first wireless device, the method for communicating over a wireless network having multiple sub-carrier frequencies, the method comprising:
   assigning one or more pilot signals to each of a plurality of sub-carrier frequencies of each of a plurality of symbols according to a predetermined pattern to assist with determining transmit beamforming channel state information, wherein the predetermined pattern indicates that for the plurality of symbols a pilot signal is to be assigned to a different one of each of the plurality of sub-carriers for at least one symbol of the plurality of symbols
   configuring the first wireless device to transmit the plurality of symbols; and
   receiving transmit beamforming channel state information derived from the plurality of symbols from a second wireless device.

7. The method of claim 6, including applying an overlay to each of the one or more pilot signals, the overlay configured to assist resolve channel dimensions when the first wireless device includes more than one transmit antenna.

8. The method of claim 6, wherein the overlay is associated with a column or row of an overlay matrix.

9. An apparatus of a first wireless device, the apparatus comprising:
   memory; and
   processing circuitry coupled to the memory, the processing circuitry configured to:
      position each of one or more pilot signals within one of a plurality of sub-carriers of each of a plurality of symbols according to a predetermined pattern to assist with determining transmit beamforming channel state information, wherein the predetermined pattern indicates that for the plurality of symbols a pilot signal is to be positioned in a different one of each of the plurality of sub-carriers for at least one symbol of the plurality of symbols;
      configure the first wireless device to transmit the plurality of symbols;
      receive transmit beamforming channel status information based on the one or more pilot signals from a second wireless device; and
      adjust transmit parameters based on the transmit beamforming channel status information.

10. The apparatus of claim 9, wherein the predetermined pattern includes assigning the pilot signal at a first sub-carrier frequency for a number of sequential symbols before placing the pilot signal at a second sub-carrier frequency.

11. The apparatus of claim 10, wherein the number of sequential symbols is equal to the number of antennas associated with the wireless transmitter.

12. The apparatus of claim 9, wherein the processing circuitry is further configured to apply an overlay to each pilot signal of the one or more pilot signals, wherein the overlay corresponds to a predetermined matrix used with a wireless receiver.

13. The apparatus of claim 9, wherein the processing circuitry is further configured to:
   encode data into each of the plurality of symbols.

14. An apparatus of a wireless device, the apparatus comprising:
   memory; and,
   processing circuitry coupled to the memory, the processing circuitry configured to:
      receive a plurality of symbols, each symbol comprising a plurality of sub-carriers and one or more pilot signals positioned at a sub-carrier frequency wherein for the plurality of symbols a pilot signal of the one or more pilot signals is positioned in a different one of each of the plurality of sub-carriers for at least one symbol of the plurality of symbols; and
      estimate transmit beamforming channel state information using the one or more pilot signals.

15. The apparatus of claim 14, wherein the processing circuitry is configured to average the beamforming channel state information over a packet of symbols, wherein the packet includes at least a portion of the plurality of symbols.

16. The apparatus of claim 15, wherein the processing circuitry is configured to time-weight average the beamforming channel state information over the packet of symbols.

17. The apparatus of claim 14, wherein the processing circuitry is configured to remove an overlay from each pilot signal to provide an un-layered pilot signal and to determine channel time and phase offsets using the un-layered pilot signal, wherein the overlay corresponds to an element of a predetermined matrix used with a transmitter of the plurality of symbols.

* * * * *